United States Patent
Suzuki et al.

(10) Patent No.: US 8,084,011 B2
(45) Date of Patent: Dec. 27, 2011

(54) METHOD AND APPARATUS FOR MANUFACTURING CARBON NANOTUBE

(75) Inventors: Yoshinobu Suzuki, Aichi-ken (JP);
Shinichi Mukainakano, Nagoya (JP);
Kenji Okeyui, Okazaki (JP); Toshiyuki Morishita, Nagoya (JP); Hisayoshi Ooshima, Oobu (JP)

(73) Assignee: DENSO CORPORATION, Kariya (JP)

( * ) Notice: Subject to any disclaimer, the term of this patent is extended or adjusted under 35 U.S.C. 154(b) by 908 days.

(21) Appl. No.: 12/000,089

(22) Filed: Dec. 7, 2007

(65) Prior Publication Data

US 2010/0278717 A1    Nov. 4, 2010

(30) Foreign Application Priority Data

Dec. 8, 2006  (JP) ................................ 2006-331952

(51) Int. Cl.
*D01C 5/00*  (2006.01)
(52) U.S. Cl. .............. 423/447.3; 423/447.1; 423/445 B; 977/842; 977/843
(58) Field of Classification Search .............. 423/447.1, 423/447.3, 445 B; 977/742, 842–843
See application file for complete search history.

(56) References Cited

U.S. PATENT DOCUMENTS

| | | | |
|---|---|---|---|
| 2002/0004028 A1* | 1/2002 | Margrave et al. | 423/447.3 |
| 2005/0042162 A1* | 2/2005 | Resasco et al. | 423/447.3 |
| 2005/0061249 A1 | 3/2005 | Miyahara et al. | |
| 2006/0034747 A1* | 2/2006 | Merino Sanchez et al. | 423/447.3 |

FOREIGN PATENT DOCUMENTS

| | | |
|---|---|---|
| JP | 2001-220674 | 8/2001 |
| JP | 2002-180252 | 6/2002 |
| JP | 2002-293524 | 10/2002 |
| JP | 2003-252613 | 9/2003 |
| JP | 2004-217511 | 8/2004 |
| JP | 2004-267926 | 9/2004 |
| JP | 2005-041752 | 2/2005 |
| JP | 2005-097014 | 4/2005 |

OTHER PUBLICATIONS

Deck, C.P.; Vecchio, K.S.; "Grwoth of Well-Aligned carbon nanotube Structures in Successive Layers". J. Phys. Chem. B 2005, 109, 12353-12357.*
"Growth of vertically aligned single-walled carbon nanotube film on quartz substrates and their optical anisotropy" by Y. Murakami et al.; Chemical Physics Letters vol. 385 (2004); pp. 298-303.

* cited by examiner

*Primary Examiner* — Stuart Hendrickson
*Assistant Examiner* — Richard M Rump
(74) *Attorney, Agent, or Firm* — Posz Law Group, PLC

(57) ABSTRACT

A carbon nanotube manufacturing method wherein a catalyst is heated in a reaction chamber while the reaction chamber is filled with argon gas containing hydrogen. When a predetermined temperature is reached in the reaction chamber, the reaction chamber is evacuated. Then a raw material gas as a carbon source is charged and sealed in the reaction chamber whereupon the synthesis of carbon nanotube begins. Subsequently, when a condition in which the synthesis of carbon nanotubes has proceeded to a predetermined level is detected, gases in the reaction chamber are exhausted. Then, the raw material gas is changed and sealed in the reaction tube again. Thereafter, the charging (synthesizing) operation and the exhausting operation are repeated until the carbon nanotube with a desired film thickness are synthesized. A carbon nanotube manufacturing apparatus is also disclosed.

20 Claims, 5 Drawing Sheets

METHOD AND APPARATUS FOR MANUFACTURING CARBON NANOTUBE

CROSS REFERENCE TO RELATED APPLICATION

The present application is based on and claims priority from Japanese Patent Application No. 2006-331952, filed Dec. 8, 2006, the content of which is incorporated herein by reference.

BACKGROUND OF THE INVENTION

1. Field of the Invention

The present invention relates to the manufacture of a carbon nanotube and more particularly to a method of and apparatus for manufacturing a vertically aligned carbon nanotube grown by chemical vapor deposition (CVD) on a substrate.

2. Description of the Related Art

In the methods proposed heretofore, a substrate with a catalyst carried thereon is placed in a reaction tube disposed in an annular furnace, and while heating the catalyst, a raw material gas serving as a carbon source is continuously brought into contact with the heated catalyst to thereby synthesize a carbon nanotube grown on the substrate in vertical alignment (see Japanese Patent Laid-open Publication (JP-A) No. 2002-180252, and Chemical Physics Letters, Vol. 385, (2004), pp. 298-303).

To reduce the proposed methods into practice, an apparatus such as shown in FIG. 4 hereof is used. The apparatus is equipped with a substrate P1 with a catalyst carried thereon, a carbon source P2, a reaction tube P3, and an annular furnace P4. In this apparatus, a raw material gas that serves as a carbon source and a carrier gas, such as argon (Ar), are continuously supplied into the reaction tube from an upstream side thereof so that carbon is supplied to the catalyst carried on the substrate and eventually a vertically aligned carbon nanotube is synthesized on the substrate.

The conventional carbon nanotube manufacturing method and apparatus have a problem however as shown in FIG. 5 in that, even when the reaction time is extended to increase the film thickness of the synthesized carbon nanotubes (namely, for the purpose of increasing the length of the carbon nanotubes), the direct proportional relationship between the reaction time and the film thickness peaks out at a certain point of time. This is attributed to the fact that due to a long time reaction, the catalyst becomes deactivated by the effect of a reaction byproduct gas and an excess raw material gas.

Furthermore, continuing the supply of carbon source causes another problem in that most of the carbons are exhausted from the reaction tube before being used in the synthesis of carbon nanotubes. This problem lowers the raw material use efficiency and increases the manufacturing cost of the carbon nanotubes.

SUMMARY OF THE INVENTION

With the foregoing problems in view, it is an object of the present invention to provide a method and apparatus, which are capable of manufacturing vertically aligned carbon nanotubes with an increased film thickness efficiently without causing deactivation of a catalyst used for synthesizing the carbon nanotubes.

To achieve the foregoing object, there is provided, according to a first aspect of the present invention, an apparatus for manufacturing a vertically aligned carbon nanotube by using a chemical vapor deposition method, the apparatus comprising: a reaction chamber in which a catalyst is placed for the growth of a carbon nanotube; a heating means for heating the reaction chamber; a supply-side opening and closing means for opening and closing a supply path that supplies a raw material gas as a carbon source to the reaction chamber; an exhaust-side opening and closing means for opening and closing an exhaust path that exhausts a gas from the reaction chamber; an exhaust operating means for exhausting the gas from the reaction chamber through the exhaust path; and an operation control means for controlling operations of the heating means, the supply-side opening and closing means, the exhaust-side opening and closing means, and the exhaust operating means. The operation control means is configured to control the supply-side opening and closing means, the exhaust-side opening and closing means, and the exhaust operating means so as to perform a charging operation of charging the raw material gas serving as the carbon source into the reaction chamber and an exhausting operation of exhausting the gas from the reaction chamber in a predetermined operation pattern.

With this arrangement, since the supply-side opening and closing means, the exhaust-side opening and closing means, and the exhaust operating means are controlled by the operation control means to perform a charging operation of charging the raw material gas serving as the carbon source into the reaction chamber and an exhausting operation of exhausting the gas from the reaction chamber, in the charging operation, a necessary quantity of raw material gas is supplied into the reaction chamber, and in the exhausting operation, a gas such as a reaction byproduct gas produced during synthesis of carbon nanotubes in the vicinity of the catalyst is exhausted from the reaction chamber with the result that the catalyst is prevented from becoming deactivated.

Furthermore, by repeating the aforesaid charging and exhausting operations, it is readily possible to increase the film thickness of vertically aligned carbon nanotubes (i.e., to increase the length of the carbon nanotubes). Especially, as compared to the conventional case in which a carbon source is supplied continuously, a higher use efficiency of the raw material and a great cost reduction can be attained.

As the heating means, a heater can be used. The supply-side opening and closing means and the exhaust-side opening and closing means may include a valve such as an electromagnetic valve. As the exhaust operating means, a vacuum pump may be used. The operation control means may include an electronic control unit such as microcomputer.

Preferably, the catalyst is placed in the reaction chamber as it is fixed on a substrate. By a catalytic action, vertically aligned carbon nanotubes can be formed on the substrate. Furthermore, since the catalyst is placed in the reaction chamber as it is fixed on the substrate, this arrangement facilitates easy handling of the carbon nanotubes when they are collected as a reaction product formed on the substrate.

It is preferable that the catalyst is heated while an inert gas containing hydrogen is introduced through the supply path into the reaction chamber. By virtue of a reduction reaction with hydrogen occurring at an elevated temperature, the catalyst can be activated efficiently.

Preferably, the raw material gas serving as the carbon source is charged into the reaction chamber with the exhaust path closed by the exhaust-side opening and closing means and the supply path opened by the supply-side opening and closing means. The arrangement ensures that the reaction chamber be filled with the raw material gas.

It is preferable that the gas in the reaction chamber is exhausted by the exhaust operating means with the supply path closed by the supply-side opening and closing means and the exhaust path opened by the exhaust-side opening and closing means. This arrangement ensures that the gas (a byproduct gas, an unreacted raw material gas and a mixture of them) is completely exhausted from the reaction chamber.

Preferably, the charging operation and the exhausting operation are alternately repeated two times or more. By thus repeating the charging and exhausting operations, it is readily possible to increase the film thickness of the vertically aligned carbon nanotubes.

The apparatus may further comprise a detecting means for detecting a condition in which the synthesis of carbon nanotubes has proceeded to a predetermined level wherein the detecting means is operationally connected to the operation control means such that the exhausting operation is performed when said condition is detected by the detecting means. When the aforesaid condition is detected by the detecting means, the operation control means determines that a predetermined amount of carbon nanotubes has been synthesized. Based on this determination, the exhausting operation is carried out to expel the reaction byproduct gas from the reaction chamber. Thereafter, by restarting the charging operation, the raw material gas is charged into the reaction chamber and the carbon nanotube synthesis resumes.

Preferably, the detecting means comprises a mean for detecting a pressure in the reaction chamber. As the synthesis of carbon nanotubes proceeds, the pressure in the reaction chamber increases due to generation of a reaction byproduct gas, for example. Accordingly, by detecting a change in the internal pressure of the reaction chamber, it is readily possible to detect a condition in which the synthesis of carbon nanotubes has proceeded to a predetermined level (where a predetermined amount of carbon nanotubes has been synthesized). In other words, detecting the pressure in the reaction chamber makes it possible to estimate the presence of a reaction product gas and eventually determine the progress of the carbon nanotube synthesis. By thus detecting a particular condition or stage of the carbon nanotube synthesis using the pressure detecting means or sensor, switching to the exhausting operation can be done at the right time.

As an alternative, the detecting means may comprise a means for detecting a gas component in the reaction chamber. Since the carbon nanotube synthesis involves generation of a reaction product gas. Accordingly, by detecting a gas component (for example, $CO_2$), it is possible to detect a particular condition in which the carbon nanotube synthesis has proceeded to a predetermined level. In other words, detecting the concentration of a reaction byproduct gas such as $CO_2$, makes it possible to estimate to what extent the synthesis reaction has proceeded and eventually secure a correct understanding of the progress of the carbon nanotube synthesis reaction. Accordingly, by thus detecting a gas component such as $CO_2$ in the reaction product gas using the gas component detecting means or gas sensor, switching to the exhausting operation can be done at the right time.

Alternatively, the detecting means may comprise a means for optically measuring a property of the substrate on which the catalyst is supported. In the case where the substrate is transparent, light transmission of the transparent substrate varies with the density of carbon nanotubes formed on the substrate. Accordingly, by checking or measuring an optical property, such as light transmission, of that part of the transparent substrate on which the carbon nanotubes are formed, it is possible to detect a specific condition in which the synthesis of carbon nanotubes has proceeded to a predetermined level. In other words, by a measurement made directly on the substrate using the optical measuring means, the progress of the carbon nanotube synthesis can be grasped correctly and switching to the exhausting operation can be done at the right time.

Preferably, the operation control means controls operations of the heating means, the supply-side opening and closing means, the exhaust-side opening and closing means and the exhaust operating means in such a manner that the catalyst is heated while the reaction chamber is filled with an inert gas containing hydrogen, subsequently when a predetermined temperature is reached in the reaction chamber, the reaction chamber is evacuated, then the raw material gas serving as a carbon source is charged and sealed in the reaction chamber, thereafter when said condition in which the synthesis of carbon nanotubes has proceeded to the predetermined level is detected, the exhaust path is opened to exhaust the reaction chamber by the exhaust operating means, then the supply path is opened and the exhaust path is closed, and while keeping this condition, the raw material gas serving as the carbon source is again changed and sealed in the reaction chamber. With this operation control, carbon nanotubes with large film thickness can be manufactured with high efficiency.

The carbon source preferably comprises an alcohol. By using the alcohol (in vapor phase) as a carbon source, a film of vertically aligned single wall carbon nanotubes (SWNT) having less defects can be easily manufactured.

Preferably, the apparatus further comprises a mechanism for keeping the alcohol at a constant temperature. The mechanism preferably comprises a heater. The heater is controlled by the operation control means to keep the alcohol at a constant temperature so that a necessary amount of alcohol vapor can be produced in a stable manner. By thus controlling the temperature of the alcohol, it is possible to keep a regular proportion of the alcohol to the carrier gas.

The catalyst preferably comprises a CoMo catalyst. The CoMo catalyst offers a remarkably high synthesis efficiency when used in combination with an alcohol as a carbon source.

The apparatus may further comprise a mechanism disposed in the reaction chamber for stirring a gaseous atmosphere in the reaction chamber. The stirring mechanism preferably comprises an electric fan. The fan is operatively connected to the operation control means. Under the control of the operation control means the fan operates to stir a gaseous atmosphere in the reaction chamber so that the raw material gas (carbon source) is distributed uniformly over the entire surface of the substrate. This arrangement increases the manufacturing efficiency of the carbon nanotubes.

According to a second aspect of the invention, there is provided a method of manufacturing a vertically aligned carbon nanotube by using a chemical vapor deposition method, the manufacturing method comprising the steps in the order named of; heating a catalyst in a reaction chamber; filling-up the reaction chamber with a raw material gas serving as a carbon source; after the lapse of a predetermined time, exhausting a reaction byproduct gas from the reaction chamber; and repeating the filling-up step and the exhausting step until a desired film of vertically aligned carbon nanotubes having a desired film thickness is synthesized.

With the method thus arranged, it is readily possible to prevent the catalyst from becoming deactivated and increase the film thickness of the vertically aligned carbon nanotubes. Furthermore, as compared to a conventional method in which the carbon source is supplied continuously, the inventive method achieves a high use efficiency of the raw material and a great cost reduction.

According to a third aspect of the invention, there is provided a method of manufacturing a vertically aligned carbon nanotube by using a chemical vapor deposition method, the manufacturing comprising the steps in the order named of: heating a catalyst in a reaction chamber; introducing a raw material gas serving as a carbon source into the reaction chamber; after the lapse of a predetermined time, introducing a carrier gas not containing the raw material gas into the reaction chamber to expel a reaction byproduct gas from the reaction chamber; and repeating the raw material gas introducing step and the carrier gas introducing step until a film of vertically aligned carbon nanotubes having a desired film thickness is are synthesized.

The method in the third aspect of the invention is also able to achieve the same advantageous effects as the method in the second aspect of the invention. Furthermore, in the method of the third aspect, merely by introducing the carrier gas (inert gas such as argon (Ar), helium (He) or Nitrogen ($N_2$)) not containing the raw material gas (carbon source) into the reaction chamber, the reaction byproduct gas is expelled or exhausted from the reaction chamber and, hence, the catalyst and its surroundings are kept clean and free from reaction byproducts. The clean-up effect can be attained by merely switching the supply path from the raw material gas side to the carrier gas side without requiring linked opening and closing operations of two valves disposed immediately upstream of and downstream of the reaction chamber. The carrier gas used herein is required to reach the proximity of the catalyst through microscopic clearances between the adjacent vertically aligned carbon nanotubes. To meet the requirement, helium (He) is most preferable for its small molecular size.

In the manufacturing methods in the second and third aspect of the invention, the predetermined time period is set to elapse when a predetermined condition in which the synthesis of carbon nanotubes in the reaction chamber has proceeded to a predetermined level (where a predetermined amount of carbon nanotubes has synthesized on a substrate, for example).

DETAILED DESCRIPTION OF THE PREFERRED EMBODIMENTS

Certain preferred embodiments of the present invention will be described with reference to the accompanying sheets of drawings.

Embodiment 1

Figure 1:
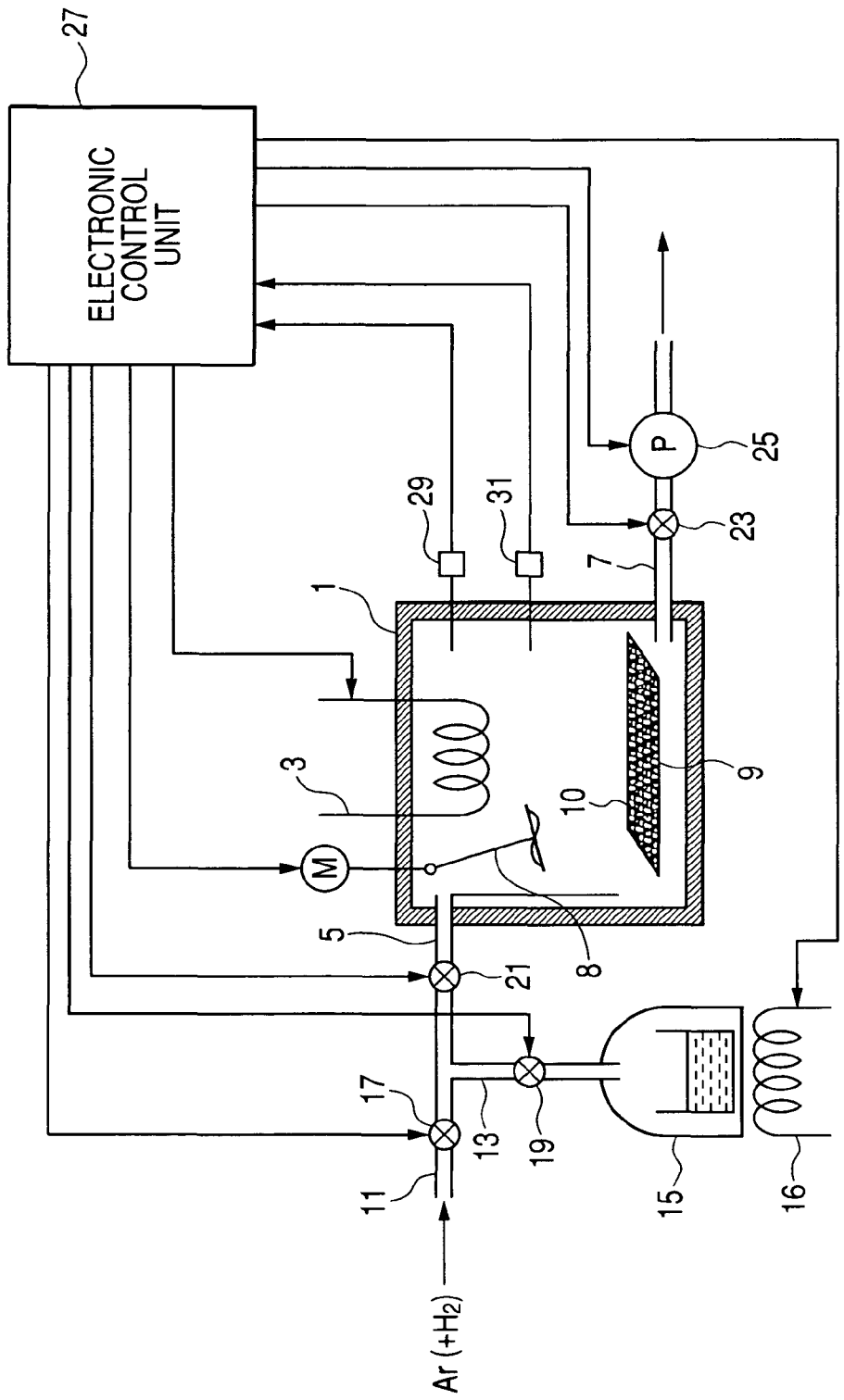
FIG. 1 is a block diagram showing an apparatus for manufacturing a carbon nanotube according to a first embodiment of the present invention.

FIG. 1 shows in block diagram a carbon nanotube manufacturing apparatus according to a first embodiment (Embodiment 1) of the present invention. As shown in this figure, the manufacturing apparatus comprises a reaction chamber 1 in which a vertically aligned carbon nanotube is manufactured by using a chemical vapor deposition (CVD) method, a heater 3 for heating the interior of the reaction chamber 1, a supply path (pipe) 5 for supplying a raw material gas serving as a carbon source into the reaction chamber 1, and an exhaust path (pipe) 7 for exhausting gases including a reaction byproduct gas from the reaction chamber 1. A substrate 9 having a catalyst 10 carried thereon is placed in the reaction chamber 1. The substrate 9 is preferably made of quartz, and the catalyst 10 is preferably a CoMo catalyst. The catalyst 10 is fixed to a surface of the substrate 9. An electric fan 8 is disposed in the reaction chamber 1 for stirring a gaseous atmosphere in the reaction chamber 1.

Connected to the supply pipe 5 are a first supply pipe 11 for supplying a mixture of argon (Ar) and hydrogen (H) as a carrier gas to the reaction chamber 1 via the supply pipe 5, and a second supply pipe 13 for supplying ethanol as a carbon source to the reaction chamber 1 via the supply pipe 5. The second supply pipe 13 is connected to a tank or container 15, which holds ethanol therein. The container 15 is equipped with a heater 16 for keeping ethanol at a constant temperature.

The first supply pipe 11 is equipped with a first valve 17 for opening and closing the first supply pipe 11. Similarly, the second supply pipe 13 is equipped with a second valve 19 for opening and closing the second supply pipe 13. The supply pipe 5 is equipped with a third valve 21 disposed downstream of a junction between the supply pipe 5 and the second supply pipe 13 for opening and closing the supply pipe 5.

The exhaust pipe 7 is equipped with a fourth valve 23 for opening and closing the exhaust pipe 7 and a vacuum pump 25 disposed downstream of the fourth valve 23 for evacuating the interior of the reaction chamber 1. The first to four valves 17-23 are electromagnetic valves that can be opened and closed in accordance with commands or instructions issued from an electronic control unit 27.

The carbon nanotube manufacturing apparatus further includes a temperature sensor 29 associated with the reaction chamber 1 for detecting a temperature in the reaction chamber 1, and a pressure sensor 31 associated with the reaction chamber 1 for detecting a pressure in the reaction chamber 1.

The electronic control unit 27 is a microcomputer-based control device, which is so configured to control operation of the carbon nanotube manufacturing apparatus by means of a microcomputer. The electronic control unit 27 has an input part (not shown) to which the temperature sensor 29 and the pressure sensor 31 are connected, and an output part (not shown) to which the heaters 3 and 16, the electric fan 8, the first to fourth valves 17-23 and the vacuum pump 25 are connected.

The electronic control unit 27, on the basis of detection signals from the sensors 29, 31 indicative of conditions in the reaction chamber 1, makes judgments to control operations of the first to fourth valves 17-23 and the vacuum pump 25 in a manner as will be described later.

In the manufacturing apparatus of the foregoing construction, the heater 3 constitutes a heating means for heating the reaction chamber 1. Similarly, the first, second and third valves 17, 19 and 21 form a supply-side opening and closing means for opening and closing the supply path including the supply pipe 5 and the first and second supply pipes 11 and 13. On the other hand, the fourth valve 23 constitutes an exhaust-side opening and closing means for opening and closing the exhaust path (pipe) 7, and the vacuum pump 26 forms an exhaust operating means for exhausting gases from the reaction chamber 1. The electric fan 8 constitutes a means for stirring a gaseous atmosphere in the reaction chamber 1. The heater 16 forms a means for keeping the raw material gas (carbon source) at a constant temperature. The electronic control unit 27 forms an operation control means for controlling operations of the heater 3, 16, the electric fan 8, the first to fourth valves 17, 19, 21 and 23, the vacuum pump 25. Furthermore, the pressure sensor 31 forms a detection means for detecting a condition in which the synthesis of carbon nanotubes has proceeded to a predetermined level (where a predetermined amount of carbon nanotubes has been synthesized, for example).

Next, a carbon nanotube manufacturing method, which is carried out by the manufacturing apparatus shown in FIG. 1, will be described below in greater detail.

(1. Preparation Process)

At first, a quartz substrate 9 having a CoMo catalyst 10 fixedly supported thereon is set in the reaction chamber 1. Then, the first, second and third valves 17, 19 and 21 are closed, and the fourth valve 23 are opened. While keeping this condition, the vacuum pump 25 is operated to evacuate the reaction chamber 1. With this evacuation, the pressure in the reaction chamber 1 decreases.

Subsequently, when the pressure sensor 31 detects a predetermined negative pressure or vacuum (A1: below 0.1 Pa, for example) developed in the reaction chamber 1, the first and third valves 17 and 21 are opened so that a mixture of argon (Ar) and hydrogen (H) as a carrier gas is introduced into the reaction chamber 1. Hydrogen is used to activate the catalyst 10 through a reduction reaction under heated condition.

Then, in order to activate the catalyst 10 under heat, the interior of the reaction chamber 1 is heated by the heater 3 to a predetermined temperature (B1: a preset value between 600° C. and 900° C.). In this instance, electric current applied to the heater 3 is controlled so as to maintain the predetermined temperature.

Subsequently, when the interior of the reaction chamber 1 is heated to the predetermined temperature, the temperature sensor 29 issues a detection signal to the electronic control unit 27 whereupon the first, second and third valves 17, 19 and 21 are closed, the fourth valve 23 is opened, and the vacuum pump 25 is operated again to evacuate the reaction chamber 1.

While the catalyst 10 is heated, the hydrogen-contained carrier gas (Ar+H) may be continuously supplied to the reaction chamber 1. In this instance, the vacuum pump 25 may be either driven continuously or stopped.

(2. Synthesis Process)

When the pressure sensor 31 detects the predetermined vacuum A1 (in the same manner as the Preparation Process) developed in the reaction chamber 1, the fourth valve 23 is closed and the vacuum pump 25 is stopped.

Then the first, second and third valves 17, 19 and 21 are opened so that ethanol vapor as a carbon source and the carrier gas (Ar+H) are introduced into the reaction chamber 1. This will increase the pressure in the reaction chamber 1. The electric fan 8 is operated to stir the gaseous atmosphere in the reaction chamber 1 to insure uniform and efficient distribution of the carbon source over the entire surface of the substrate 9.

Subsequently, when the pressure sensor 31 detects a predetermined pressure (A2: a preset value between 5 and 100 Torr) in the reaction chamber 1, the third valve 21 is closed. In this condition, the ethanol vapor is decomposed and the synthesis of carbon nanotubes begins, which will further increase the pressure in the reaction chamber 1. During synthesis of carbon nanotubes, the temperature in the reaction chamber 1 is kept at the predetermined temperature B1 (for example, 600° C. to 900° C.) by controlling operation of the heater 3.

When the pressure sensor 31 detects another predetermined pressure (A3: A2+5 Torr, for example) in the reaction chamber 1, it is determined that the synthesis of carbon nanotubes has proceeded to a predetermined level (where a predetermined amount of carbon nanotubes has been synthesized in the current operation run). Then, the operation proceeds to an exhaust process).

(3. Exhaust Process)

In the exhaust process, the fourth valve 23 is opened and the vacuum pump 25 is operated to evacuate the reaction chamber 1. With this evacuation, since a byproduct gas, which is produced during synthesis of the carbon nanotube in the vicinity of the substrate 9, is exhausted from the reaction chamber 1, the catalyst 10 is prevented from becoming deactivated.

Subsequently, when the pressure sensor 31 detects a predetermined negative pressure or vacuum A1, it is determined that exhausting of the reaction chamber 1 has completed. Then, operation proceeds again to the synthesis process in which the fourth valve 23 is closed, the vacuum pump 25 is stopped, and the third valve 21 is opened.

Thereafter, the synthesis process and the exhaust process are repeated until a film of vertically aligned carbon nanotubes having a desired film thickness is synthesized on the substrate 9.

Figure 2:
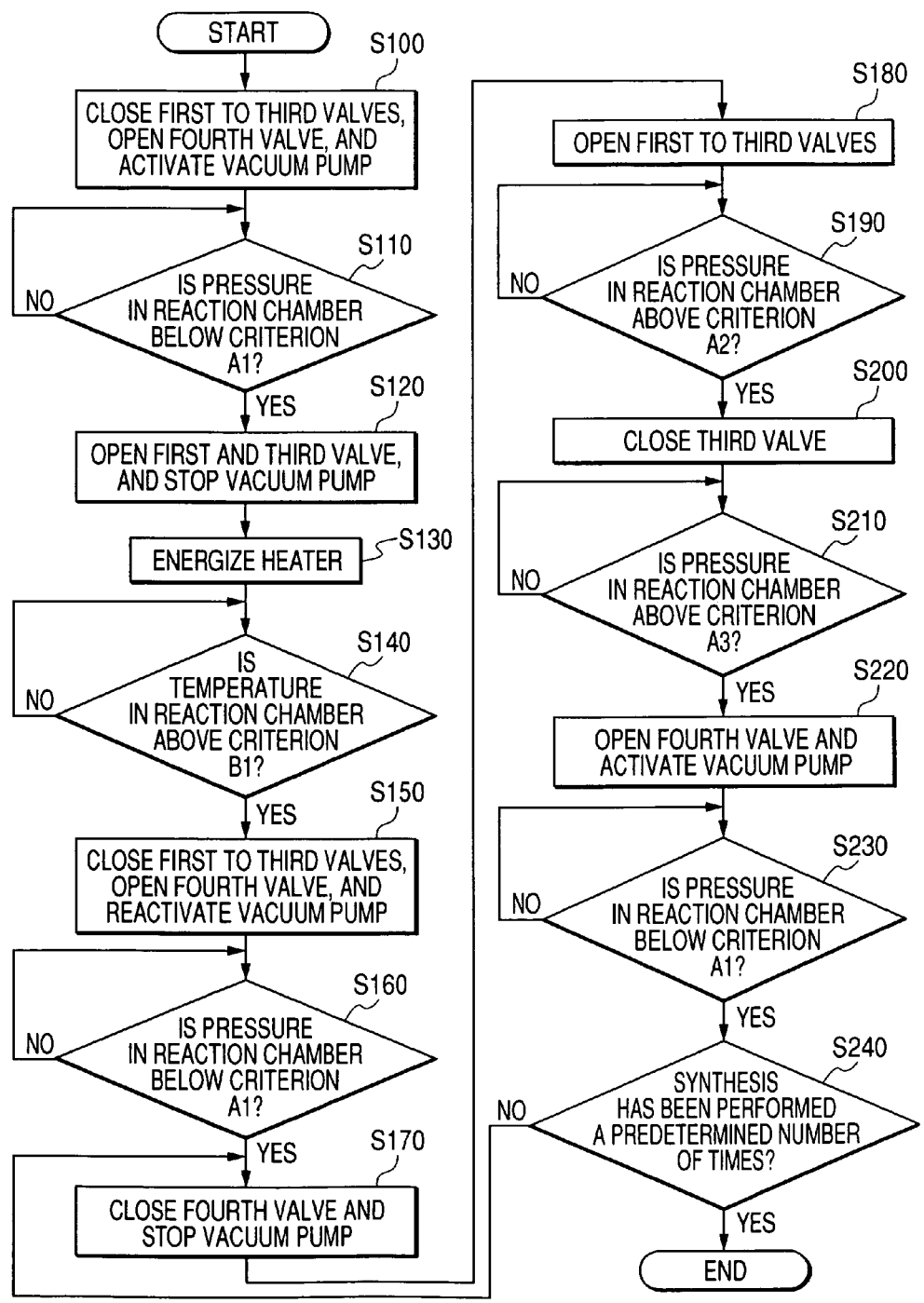
FIG. 2 is a flowchart showing a sequence of operations achieved by an electronic control unit of the apparatus according to the first embodiment.

Next, a sequence of control operations achieved by the electronic control unit 27 for carrying out the foregoing carbon nanotube manufacturing method will be described below with reference to a flowchart shown in FIG. 2.

After a substrate 9 having a catalyst 10 carried thereon is set in the reaction chamber 1, the manufacturing apparatus shown in FIG. 1 starts operating whereupon control operations of the electronic control unit 27 is started. At a first step S100, the first, second and third valves 17, 19 and 21 are closed, the fourth valve 23 is opened, and the vacuum pump 25 is activated. Thus, evacuation of the reaction chamber 1 is started.

Subsequently, a step S110 determines whether the pressure in the reaction chamber 1 is below a first criterion (predetermined vacuum) A1. If the determination is affirmative (YES), this means that evacuation of the reaction chamber 1 has been completed and the control goes on to a step S120. Alternatively, when the determination is negative (NO), the control goes standby.

Step S120, on the basis of the affirmative determination made at step S110, opens the first and third valves 17 and 21 and stops the vacuum pump 25. Thus, the carrier gas (Ar+H) is introduced into the reaction chamber 1.

Subsequently, a step S130 energizes the heater 3 to heat the interior of the reaction chamber 1.

At the next step S140, a judgment is made to determine whether the temperature in the reaction chamber 1 is above a second criterion B1 (for example, 600° C. to 900° C.). If the judgment is affirmative (YES), the control goes on to a step S150. Alternatively, if the judgment is negative (NO), the control goes standby.

Step S150, on the basis of the determination that the catalyst 10 has been activated by reductive reaction with hydrogen at an elevated temperature above the criteria B1, again closes the first, second and third valves 17, 19 and 21, opens the fourth valve 23, and activates the vacuum pump 25.

Subsequently, a step S160 determines whether the pressure in the reaction chamber 1 is below the criterion A1. If the determination is affirmative (YES), the control goes on to a step S170. Alternatively, if the determination is negative, the control goes standby.

Step S170, on the basis of the determination that evacuation of the reaction chamber 1 has completed, closes the fourth valve 23 and stops the vacuum pump 25.

Subsequently, the control advances to a step S180 where the first, second and third valves 17, 19 and 21 are opened to introduce the raw material gas together with the carrier gas (Ar+H) into the reaction chamber 1.

At the next step S190, a judgment is made to determine whether the pressure in the reaction chamber 1 is above a third criterion A2 (where A1<A2). If the judgment is affirmative (YES), the control goes on to a step S200. Alternatively, if the judgment is negative (NO), the control goes standby.

Step S200, on the basis of the determination that charging of the raw material gas has completed, closes the third valve 21.

Subsequently, a step S210 determines whether the pressure in the reaction chamber 1 is above fourth criterion A3 (where A2<A3). If the determination is affirmative (YES), the control goes on to a step S220. Alternatively, if the determination is negative (NO), the control goes standby.

Step S220, on the basis of the determination that a carbon nanotube has been grown, opens the fourth valve 23 and activates the vacuum pump 25 again to thereby start evacuation of the reaction chamber 1.

At the next step S230, a judgment is made to determine whether the pressure in the reaction chamber 1 is below the criterion A1. If the judgment is affirmative (YES), the control goes on to a step S240. Alternatively, if the judgment is negative (NO), the control goes standby.

Step S240 determines whether the foregoing sequence of processes (synthesis and exhaust processes) has been performed a predetermined number of times. If the determination is affirmative (YES), the control comes to an end. Alternatively, if the determination is negative (NO), the control goes back to step S170 and the synthesis process and the exhaust process are repeated again.

In the first embodiment just described above, the preparation process, synthesis process, and exhaust process are performed in the named order on the carbon nanotube manufacturing apparatus of FIG. 1 while repeating the synthesis process and the exhaust process a predetermined number of times until a desired film of carbon nanotubes are grown on the substrate 9.

According to the first embodiment of the invention, since a byproduct gas produced during synthesis of carbon nanotubes in the vicinity of the substrate 9 is exhausted efficiently, it is possible to prevent deactivation of the catalyst 10 and also increase the film thickness of vertically aligned carbon nanotubes. Furthermore, as compared to the conventional method in which a carbon source is supplied continuously, the first embodiment of the invention offers a higher use efficiency of the raw material and a great cost reduction.

Embodiment 2

A second embodiment (Embodiment 2) of the present invention will be described below with reference to FIG. 3. These parts which are similar to those described above with respect to the first embodiment (Embodiment 1) will not be described to avoid unnecessary duplication.

Figure 4:
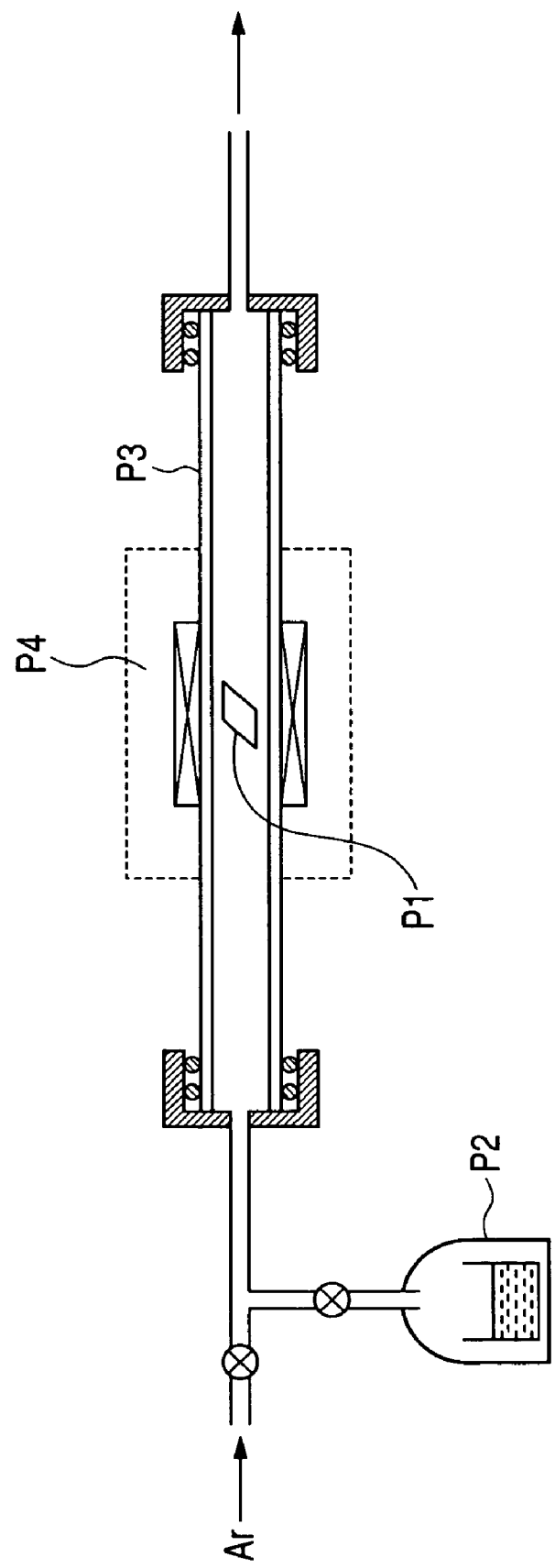
FIG. 4 is a block diagram showing a conventional carbon nanotube manufacturing apparatus.
Figure 5:
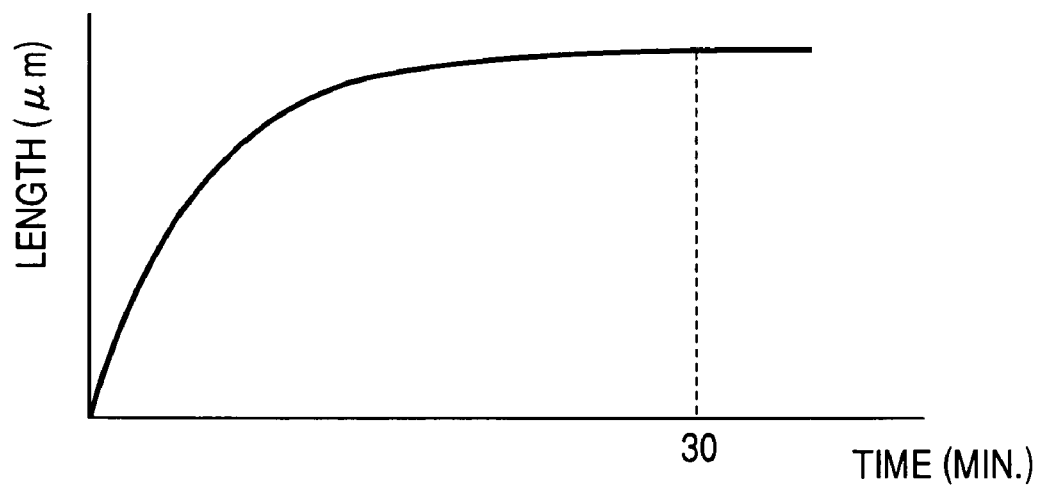
FIG. 5 is a graph showing the relationship between reaction time and film thickness observed when vertically aligned carbon nanotubes are synthesized on the conventional carbon nanotube manufacturing apparatus.

In Embodiment 2 a carbon nanotube manufacturing apparatus employs an annular furnace, such as used in the conventional apparatus shown in FIG. 4.

Figure 3:
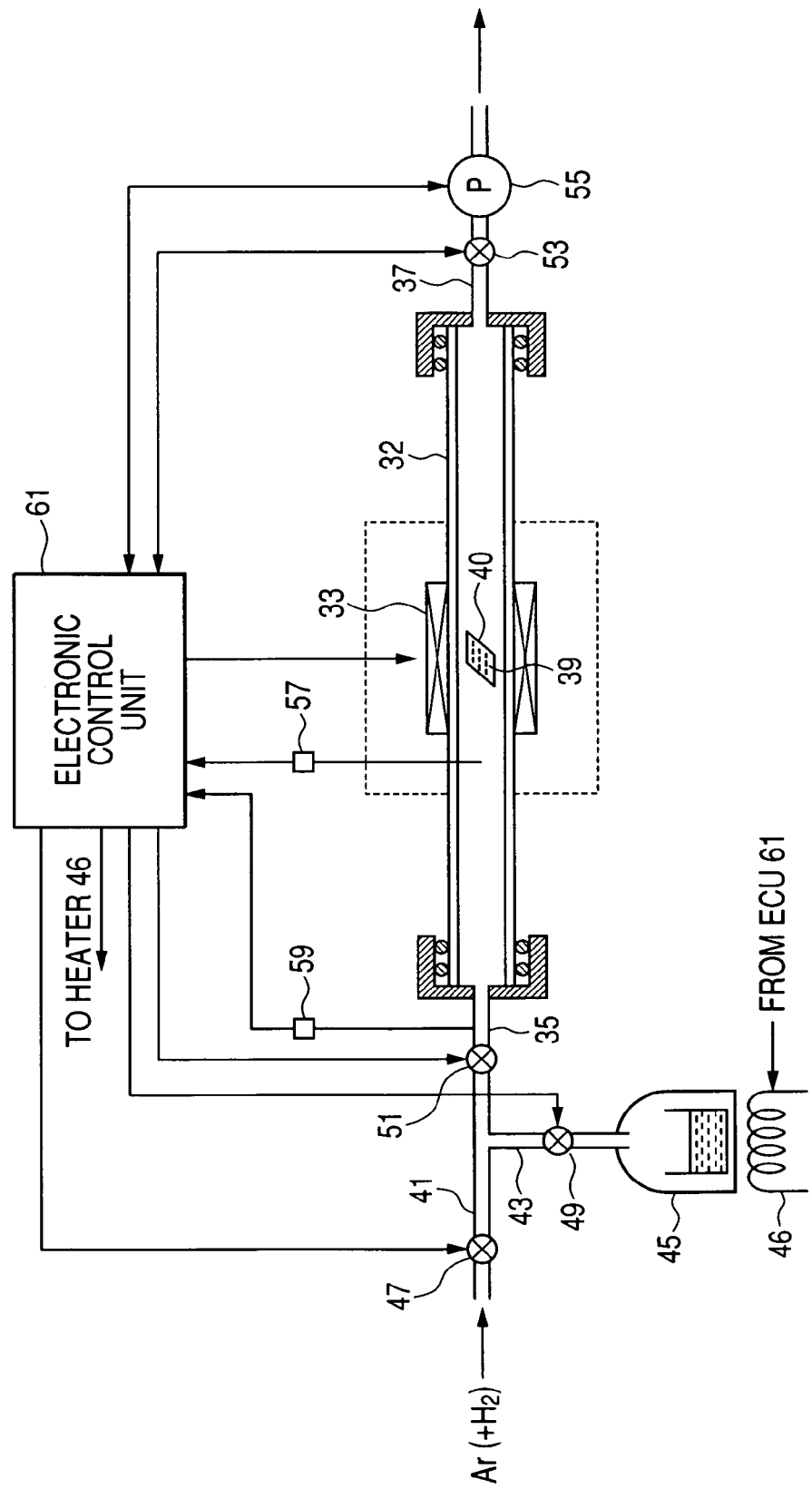
FIG. 3 is a block diagram showing an apparatus for manufacturing a carbon nanotube according to a second embodiment of the present invention.

More specifically, as shown in FIG. 3, the carbon nanotube manufacturing apparatus comprises a tubular reaction chamber 32, a heater (annular furnace) 33, a supply path (pipe) 35, and an exhaust path (pipe) 37. A substrate 39 having a catalyst 40 carried thereon is placed in the tubular reaction chamber 32.

Connected to the supply pipe 35 are a first supply pipe 41 for supplying Ar as a carrier gas to the reaction chamber 32 via the supply pipe 35, and a second supply pipe 43 for supplying ethanol as a carbon source to the reaction chamber 32 via the supply pipe 35. The second supply pipe 43 is connected to a tank or container 45 in which ethanol is stored. The container 45 is equipped with a heater 46 for keeping ethanol at a constant temperature.

The first supply pipe 41 is equipped with a first valve 47 for opening and closing the first supply pipe 41, and the second supply pipe 43 is equipped with a second valve 49 for opening and closing the second supply pipe 43. The supply pipe 35 is equipped with a third valve 51 disposed downstream of a junction between the supply pipe 35 and the second supply pipe 43 for opening and closing the supply pipe 35.

The exhaust pipe 37 is equipped with a fourth valve 53 for opening and closing the exhaust pipe 37 and a vacuum pump 55 disposed downstream of the fourth valve 53 for evacuating the interior of the reaction chamber 32.

The carbon nanotube manufacturing apparatus further includes a temperature sensor 57 associated with the reaction chamber 32 for detecting a temperature in the reaction chamber 32, and a pressure sensor 59 associated with the supply pipe 35 for detecting a pressure in the supply pipe 35. The pressure sensor 59 is disposed downstream of the third valve 51 so that a pressure detected by the pressure sensor 59 while the third and fourth valves 51 and 53 are in the closed state is indicative of the pressure inside the reaction chamber 32.

An electronic control unit 61 of the carbon nanotube manufacturing apparatus has an input part (not shown) to which the temperature sensor 57 and the pressure sensor 59 are connected, and an output part (not shown) to which the heaters 33 and 46, the first to fourth valves 47-53 and the vacuum pump 55 are connected.

In Embodiment 2, control is performed in the same manner as Embodiment 1 and the same advantageous effects as attained in Embodiment 1 can be also attained.

Embodiment 3

Next, description will be made of a third embodiment (Embodiment 3) of the present invention. These parts which are similar to those described above with respect to the first and second embodiments (Embodiments 1 and 2) will be omitted from the description to avoid unnecessary duplication.

In each of Embodiments 1 and 2, the pressure sensor 31 or 59 for detecting the pressure in the reaction chamber 1 or 32 is used as a detecting means for detecting a condition in which the synthesis of carbon nanotubes has proceeded to a predetermined level. In Embodiment 3, however, the detecting means consists of a gas sensor, which is capable of monitoring a gaseous component in the reaction chamber 1 or 32 so as to determine whether the synthesis of carbon nanotubes has proceeded to the predetermined level.

More specifically, with the progress of a carbon nanotube synthesis operation, the concentration of a reaction byproduct (for example, $CO_2$) increases. Accordingly, by monitoring the byproduct ($CO_2$) concentration by the gas sensor, it is readily possible to determine whether the synthesis of carbon nanotubes has proceeded to a predetermined level.

By thus using the gas sensor, Embodiment 3 is able to achieve the same advantageous effects as attained in Embodiments 1 and 2.

Embodiment 4

Next, a fourth embodiment (Embodiment 4) of the present invention will be described. In this embodiment, these parts which are similar to those described above with respect to the first to third embodiments (Embodiments 1 to 3) will be omitted from the description to avoid unnecessary duplication.

In Embodiment 4, the detecting means consists of an optical sensor such as photodetector for optically detecting a film thickness of carbon nanotubes formed on a surface of the substrate 9, 39 so as to directly determine whether the synthesis of carbon nanotubes has proceeded to a predetermined level.

More specifically, a light beam is emitted onto one surface of the substrate 8, and a property (such as intensity) of light transmitted through the substrate 8 is detected by the optical sensor to determine whether synthesis of carbon nanotubes has proceeded to a predetermined level. In other words, since the intensity of transmitted light decreases with an increase in the film thickness of carbon nanotubes formed on one surface of the substrate 9, 39, it is therefore possible to determine that carbon nanotubes become dense or larger in film thickness as the intensity of transmitted light decreases.

By thus using the optical sensor, Embodiment 4 is able to achieve the same advantageous effects as Embodiments 1 to 3.

Embodiment 5

Next, description will be made of a fifth embodiment (Embodiment 5) of the present invention, which is directed to a method of manufacturing a carbon nanotube. In this embodiment, these parts which are similar to those described above with respect to the first to fourth embodiments (Embodiments 1 to 4) will be omitted from the description to avoid unnecessary duplication.

In this embodiment, the same carbon nanotube manufacturing apparatus as used in Embodiment 1 shown in FIG. 1 is also employed. In the manufacturing method of Embodiment 1 a preparation process, a synthesis process and an exhausting process are carried out while repeating the synthesis process and the exhausting process until vertically aligned carbon nanotubes with a desired film thickness are synthesized on the substrate 9. Differing from Embodiment 1, this embodiment (Embodiment 5) employs a cleaning process in place of the exhaust process. In the cleaning process, a carrier gas alone (i.e., without a carbon source) is allowed to flow through the reaction chamber 1 to replace a gas containing byproducts in the vicinity of the catalyst 10. The cleaning process can thus achieve the same effect as the exhaust process.

More specifically, the carbon nanotube manufacturing method according to Embodiment 5 comprises a preparation process, a synthesis process and a cleaning process.

The preparation process is the same as that of Embodiment 1 discussed above.

The synthesis process may be the same as that of Embodiment 1, or alternatively, can be modified in a manner as described below.

In a modified synthesis process, the fourth valve 23 is open and the vacuum pump 25 is continuously operated and, while keeping this condition, the first, second and third valves 17, 19 and 21 are opened to thereby introduce a carrier gas (Ar+H) and ethanol vapor (carbon source) into the reaction chamber 1.

Then, by using an output signal from the pressure sensor 31, valve openings of the third and fourth valves 21 and 23 are adjusted in such a manner that the pressure in the reaction chamber 1 is kept at a predetermined pressure (for example, 5 to 100 Torr) and the carbon source (ethanol vapor) is continuously supplied into the reaction chamber 1.

Subsequently, by using a detecting means such as one used in Embodiment 3 or 4, a condition in the reaction chamber 1 is checked to determine whether the synthesis of carbon nanotubes has proceeded to a predetermined level. If the determination is affirmative, the next process is performed.

The next process is a cleaning process and performed in place of the exhaust process in Embodiment 1. In the cleaning process, the second valve 19 is closed to shut off the supply of carbon source (ethanol vapor) into the reaction chamber 1, and the first, third and fourth valves 17, 21 and 23 are kept in the open state to allow the carrier gas (Ar+H) to flow through the reaction chamber 1 for a predetermined period of time.

Continuously flowing carrier gas removes reaction byproducts from around the catalyst 10. The cleaning process terminates when the predetermined time period has elapsed. Alternatively, the cleaning process may be continued until the reaction byproducts are undetectable at an outlet of the exhaust pipe 7. The cleaning process is followed by the synthesis process and, thereafter, and the synthesis process and the cleaning process are repeated until vertically aligned carbon nanotubes with a desired film thickness are synthesized on the substrate 9.

In Embodiment 5 the same advantageous effects as attained in Embodiment 1 can be also achieved.

Obviously, various minor changes and modifications are possible in the light of the above teaching. It is to be understood that within the scope of the appended claims the present invention may be practiced otherwise than as specifically described.

What is claimed is:

1. A method of manufacturing a vertically aligned carbon nanotube by using a chemical vapor deposition method, comprising the steps in the order named of:
   providing a substrate and a catalyst to be fixed on the substrate, in a reaction chamber;
   heating the catalyst fixed on the substrate in the reaction chamber;
   filling-up the reaction chamber with a raw material gas serving as a carbon source, thereby synthesizing vertically aligned carbon nanotubes in the reaction chamber;
   after a film thickness of vertically aligned carbon nanotubes synthesized on the substrate has increased by at least a measurable amount, exhausting a reaction byproduct gas from the reaction chamber; and
   repeating the filling-up step and the exhausting step until a film of vertically aligned carbon nanotubes having a desired film thickness is manufactured.

2. The method according to claim 1, wherein the carbon source comprises an alcohol.

3. The method according to claim 2, wherein the alcohol is kept at a constant temperature.

4. The method according to claim 1, wherein the catalyst comprises a CoMo catalyst.

5. The method according to claim 1, wherein during the synthesis of carbon nanotubes, the raw material gas in the reaction chamber is stirred.

6. A method of manufacturing a vertically aligned carbon nanotube by using a chemical vapor deposition method, comprising the steps in the order named of:
- providing a substrate and a catalyst to be fixed on the substrate, in a reaction chamber;
- heating the catalyst fixed on the substrate in the reaction chamber;
- introducing a raw material gas serving as a carbon source into the reaction chamber, thereby synthesizing carbon nanotubes in the reaction chamber;
- after a film thickness of vertically aligned carbon nanotubes synthesized on the substrate has increased by at least a measurable amount, introducing a carrier gas not containing the raw material gas into the reaction chamber to expel a reaction byproduct gas from the reaction chamber; and
- repeating the raw material gas introducing step and the carrier gas introducing step until a film of vertically aligned carbon nanotubes having a desired film thickness is manufactured.

7. The method according to claim 6, wherein the carbon source comprises an alcohol.

8. The method according to claim 7, wherein the alcohol is kept at a constant temperature.

9. The method according to claim 6, wherein the catalyst comprises a CoMo catalyst.

10. The method according to claim 1, further comprising, between the heating step and the filling-up step, the step of introducing into the reaction chamber a mixture of an inert gas and a reducing gas for reducing the catalyst under a heated condition of a temperature required for the reduction of the catalyst, and after the temperature is reached in the reaction chamber, evacuating the reaction chamber.

11. The method according to claim 10, wherein the inert gas includes argon, and the reducing gas includes hydrogen.

12. The method according to claim 1, wherein the increase of the film thickness is determined by detecting a pressure in the reaction chamber.

13. The method according to claim 1, wherein the increase of the film thickness is determined by detecting a concentration of the reaction byproduct in the reaction chamber.

14. The method according to claim 1, wherein the increase of the film thickness is determined by detecting a film thickness of carbon nanotubes formed on a surface of the substrate.

15. The method according to claim 14, wherein the film thickness of carbon nanotubes synthesized on the substrate is detected by optically measuring a transmittance of the substrate with the film of carbon nanotubes formed thereon.

16. The method according to claim 6, further comprising, between the heating step and the raw material gas introducing step, the step of introducing into the reaction chamber a mixture of an inert gas and a reducing gas for reducing the catalyst under a heated condition of a temperature required for the reduction of the catalyst, and after the temperature is reached in the reaction chamber, evacuating the reaction chamber.

17. The method according to claim 16, wherein the inert gas includes argon, and the reducing gas includes hydrogen.

18. The method according to claim 6, wherein the increase of the film thickness is determined by detecting a concentration of the reaction byproduct in the reaction chamber.

19. The method according to claim 6, wherein the increase of the film thickness is determined by detecting a film thickness of carbon nanotubes formed on a surface of the substrate.

20. The method according to claim 19, wherein the film thickness of carbon nanotubes synthesized on the substrate is detected by optically measuring a transmittance of the substrate with the film of carbon nanotubes formed thereon.

* * * * *